March 9, 1954 N. E. HEINTZELMAN 2,671,317
ELECTROHYDRAULIC OPERATOR
Filed Dec. 19, 1949 2 Sheets-Sheet 1

INVENTOR
NORTON E. HEINTZELMAN
By
ATTORNEY

Patented Mar. 9, 1954

2,671,317

UNITED STATES PATENT OFFICE 2,671,317

ELECTROHYDRAULIC OPERATOR

Norton E. Heintzelman, Grand Rapids, Mich., assignor to Wolverine Finishes Corporation, Grand Rapids, Mich., a corporation of Michigan Application December 19, 1949, Serial No. 133,741

4 Claims. (Cl. 60—52)

The present invention provides a remotely-controllable actuator particularly well adapted for use with valve mechanisms. Motor-operated valves are not broadly new, but the particular characteristics of the present invention open a much broader field of utility for this type of device. In situations where many storage tanks and associated conduit systems become involved in carefully controlled mixing and processing operations, it is highly desirable to make use of a large number of highly reliable valve mechanisms which can be controlled from a central point. It is obvious that if a valve is not to be periodically attended by a worker in order to open and close the same, the mechanism must be of the utmost reliability in view of the absence of the cursory inspection that is automatically made each time a valve is manually operated. It is also necessary that the extremes of open and closed positions must be positive and that leakage must be absolutely prevented. This latter is not only necessary to preserve the quality of the mixing operations, but to protect the valve itself from the effects of erosion due to the passage of minute quantities of fluid over the valve surfaces under pressure as is the case when the valve surfaces do not positively seat tightly.

Users of this type of equipment have found it also to be desirable that a valve shall have a normal position either completely open or completely closed, with that position being determined by the mechanism itself and not by outside control equipment. The value of this arrangement is obvious if it be considered for a moment that a power failure might occur before a valve shall have reached a final position. The continuous passage of the fluid through a partially opened valve would not only disturb the mixing or metering operations but would endanger the contours of the valve surfaces as outlined above. It has been found most valuable that the "normal" position of a valve should be fully closed, so that the seating of the valve shall be determined by forces that are constant and not dependent upon outside influences. The power mechanism is therefore utilized to open the valve and to hold it in the opened position as long as is desired.

Another problem in the design of power-operated valve mechanisms has been the tendency for the controlled fluid to find its way between relatively moving surfaces and either generate corrosion of the mechanical parts or remove the lubricant so as to permit undue wear. Where hydraulic valve mechanisms are used, an added problem occurs due to the tendency of the controlled fluid to become mixed with and alter the characteristics of the hydraulic fluid.

As a practical matter, the size and relative cost of a valve mechanism is of extreme importance; for if the performance characteristics were to completely solve all of the problems involved, it would still be necessary that the cost of installing the devices would not render the project prohibitive. As these mechanisms are frequently used in connection with large numbers of conduits associated with a relatively small room or shelter, it is obvious that their overall dimensions must be a minimum to permit their installation in banks in which they are as closely spaced as the requirements of the various conduits might require.

A large amount of the utility of this type of mechanism is associated with its adaptability for use with a central control station, and it is obvious that the amount of energy necessary to operate the valve should be reduced to a minimum to avoid undue complexity of the control station and also to minimize the cost of the system communicating between the control station and the valve mechanism. All this must be accomplished while retaining a relatively large actuating force necessary to operate valves in which a considerable amount of pressure is required between the valve surfaces, as in the case of liquids having an extremely low viscosity and a tendency to leak through even the closest fitting surfaces.

The present invention provides a valve mechanism which will satisfy the above requirements. The force-applying system is built around a hydraulic actuating mechanism operated by a pump driven by an electric motor, in the preferred form of the invention. The piston rod associated with the hydraulic actuator is continued to form a force-applying member directly associated with the moving valve surface. To create a normally closed position of the mechanism, a heavy compression spring is placed in position to continually urge the valve in the desired direction. The opening of the valve involves the running of the motor to cause the pump to generate sufficient pressure to oppose the spring and to raise the valve from its seat. If the motor is stopped, the pressure is removed from the piston, and the valve is again moved into the closed position by the action of the spring. Obviously, this type of arrangement requires a by-pass permitting the egress of the hydraulic fluid when the pressure is not desired. This by-pass can be of either such small dimensions that the continued flow through it is small in comparison with the delivery of the pump, or the by-pass may be valve-controlled so that it is open only during the period in which the pump is not active. The preferred and simplest form of the invention, however, involves the use of a screw rotating at high speed within the hydraulic fluid and closely surrounded by a suitable chamber. The inter-action between the fixed walls of the chamber and the rotating screw causes a tendency for the hydraulic fluid to be moved axially along the chamber and to generate the required pressure. When the rotation of the screw stops, a helical path around the threads forms the required by-pass mentioned above, and auxiliary conduits are not necessary.

Mechanism is provided for the holding valve in the open position. This mechanism is of the "active" type in which maintenance of energy supply is necessary to maintain the holding device in holding position. The absence of this energy supply permits the holding device to become inoperative and again permits the valve to be moved to closed position under the action of the spring. The most easily controlled form of holding mechanism has been found to include a pivoted plate having a projection which engages a suitable recess in a member directly associated with the force-applying rod as soon as the rod reaches the open position. When this condition exists, the holding plate comes into engagement with a suitable magnetic field and is securely held in that position by the effects of a small amount of electrical current supplied to the coil generating the field. The termination of the supply of current substantially releases the magnetic field and permits the holding member to snap to the released position. The force of the valve spring creates a continuous tendency to urge the holding plate to the releasing position, and this force must be balanced by the effects of the magnetic field in order to hold the valve open.

Since the operation of the valve involves the running of the motor sufficiently to raise the valve to the opened position, and the subsequent holding of that position, it follows that the running of the motor may be terminated as soon as the opened position has been reached. This is provided for by the present invention by the use of a switch operated upon by the holding member. As soon as the holding member reaches cooperating position with the magnetic field, a projection comes to bear upon a switch which terminates the running of the motor. The supply of energy to the device after this point has been reached is solely that which is required to maintain the magnetic field.

In order to isolate the hydraulic fluid and the moving parts of the mechanism from the controlled fluid, a bellows-type connection surrounds the actuating rod and the opening through which the actuating rod passes into the conduit. Leakage through these two relatively moving surfaces is therefore confined to a small space surrounding the actuating rod and the fluid is thereby prevented from coming into contact with the hydraulic fluid in the cylinder. The actuating of the mechanism expands and compresses the bellows and the sealing effect is thereby continuously maintained.

As has been noted above, the performance features of a device of this type, valuable though they may be, must be coupled with a type of structure occupying a relatively small space and be relatively inexpensive to manufacture. Since these devices are conventionally used in large numbers, the cost of an entire installation would be influenced very greatly by small differences in cost of the individual valve assemblies. The preferred form of the present invention involves a substantially coaxial arrangement in which a single rod forms the piston rod, the valve actuator, and the means for cooperating with the holding mechanism. The closing spring surrounds a portion of this rod and is conveniently confined within a chamber which is also coaxial with the rod and the main hydraulic piston and cylinder. The pump of the preferred form of the invention (the screw) is disposed so that the lower portion of the screw is opposite the portion of the cylinder where the pressure is to be admitted. The opposite end of the screw is preferably arranged at the upper end of the cylinder and corresponds to the low pressure or reservoir side of the system. A direct drive arrangement associates the screw with a relatively high speed motor, and the opposite end of the motor may be devoted to the usual control connection and connecting point for the power leads. The holding mechanism and the motor control switch are preferably at the end of the device opposite from the valve itself. It will be seen that this arrangement places the motor control switch and solenoid at a very convenient relationship with respect to the holding plate and that all of the parts are spaced in the best possible relationship one with the other requiring the minimum amount of wiring, conduits, and mechanical connections.

In any hydraulic mechanism, it is very desirable to provide an arrangement for assuring that the filling of the device to the required level with the fluid medium may be accomplished without the requirement of a variety of complicated maneuvers. The problem, of course, is the removal of accumulations of air which would prevent the complete filling with fluid as required. The filling of a device built according to the present invention is vastly simplified by the use of a hollow rod as an actuating member, since this rod preferably passes through the entire length of the machine and is available at the upper or at the opposite end from the controlled conduit. A lateral connection to the hollow interior of this rod at the pressure side of the piston is provided, and this permits the filling of the device on the lower pressure side of the piston so that the fluid passes from that area around through the screw and into the pressure side without being inhibited by the generation of air pressure. As the filling proceeds to a point where all of the air is removed from the system, a cap is placed upon the upper end of the hollow actuating rod and the system is then in condition to develop the pressure required under its normal operation.

The various features of the present invention will be analyzed in detail by a discussion of the particular embodiments which are illustrated in the accompanying drawings. In these drawings.

*Force-applying mechanism*

Figure 1:
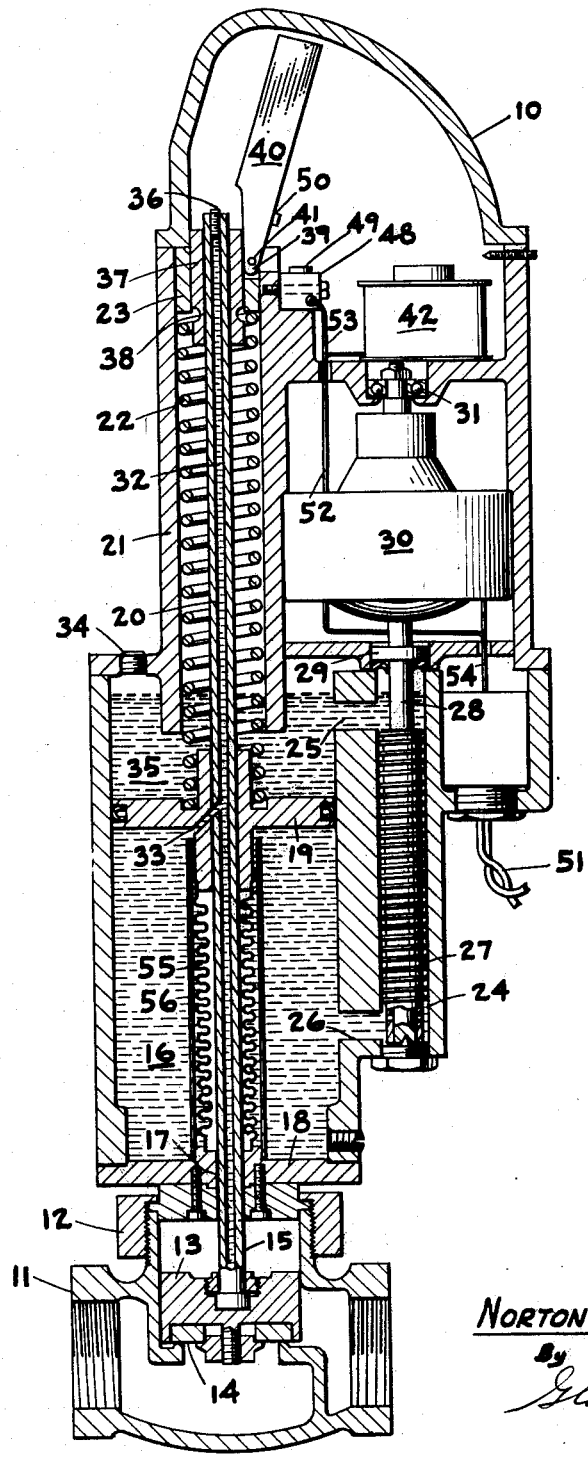
Figure 1 is an elevation in section of the valve mechanism embodying the present invention with the valve in the closed position.
Figure 2:
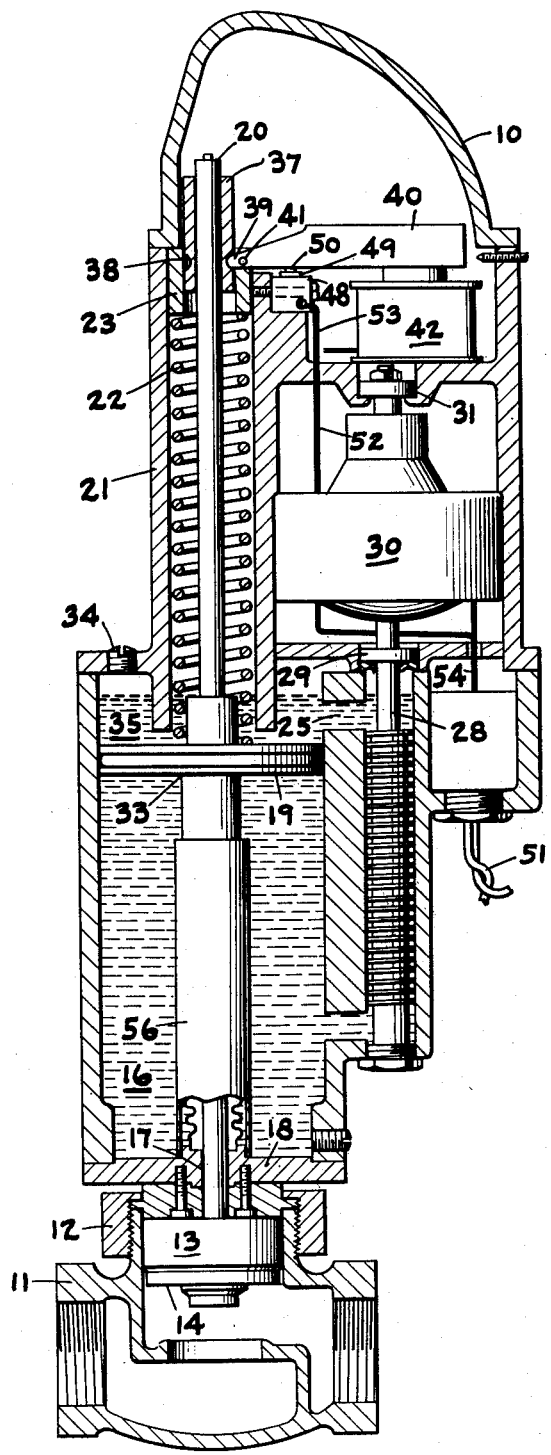
Figure 2 is also an elevation in section of the same mechanism shown in Figure 1 with the valve in the open position.

Referring to Figures 1 and 2 of the drawings, the valve actuator generally designated as 10 is shown attached to the valve 11 by means of the connector 12. The valve 11 is associated with a conduit by threaded engagement at the open ends. The active portion of the valve 11 comprises the moving valve member 13 which cooperates with the seat indicated at 14. The valve member 13 is firmly attached to the actuating or force-applying rod 15. Rod 15 enters the cylinder chamber 16 by a suitable opening 17 in the end-plate 18 as shown. It will be obvious that sliding engagement occurs between the end-plate 18 and the rod 15. The piston 19 is firmly attached to the rod 15, and the rod continues on beyond the piston to form an extension 20 surrounded by the chamber 21 and the spring 22. Spring 22 in the preferred form of the invention illustrated is of the compression type and operates between the piston 19 and the spring seat 23 to continuously urge the rod 15 and the valve member 13 toward the closed position shown in Figure 1.

Disposed to one side of the cylinder 16, a cylindrical chamber 24 is provided which communicates with the cylinder 16 by means of the ports 25 and 26. The chamber 24 fits rather closely but with running clearance around the threaded member 27 provided with the driving shaft 28. This shaft is held in a suitable bearing 29 and is operatively connected with the motor 30. The opposite end of the armature of the motor 30 is supported in the bearing system indicated at 31. Motor 30 is adapted to drive the threaded member 27 at a relatively high speed, and the interaction between the wall of the chamber 24 and the threaded member 27 is such that the hydraulic fluid is forced in the direction of the port 26. The walls of the chamber 24 have a tendency to retard the rotational flow of the fluid to a velocity slower than the periphery of the rotating threaded member. With the speed differential thus created, the rotating threaded member tends to force the fluid in an axial direction depending upon the direction of rotation and the direction of the particular helix angle used. The helix angle and direction of rotation are selected in the present device so that pressure is generated at the port 26.

As soon as the rotation of the helical member 27 ceases, or slows to a point where the pressure generated becomes less than sufficient to overcome the action of the spring 22, the annular passage provided by the threads of the member 27 operates as a by-pass for the fluid which then flows in an opposite direction from port 26 through the threaded member and out port 25 permitting the piston 19 to be moved in a downward direction by the spring 22.

In the preferred form of the present invention, the rod 15 is provided with the hollow interior 32. After the assembly of the piston 19 to the rod 15, the vent passage 33 is machined as shown permitting communication between the cylinder 16 and the hollow interior 32. To fill the device with hydraulic fluid, the plug 34 may be removed and fluid pumped into the upper portion 35 of the cylinder 16. This fluid fills the entire cylinder 16 by flowing through the port 25, the chamber 24, the port 26, and the lower portion of the cylinder 16. During this flow of fluid, air is constantly passing out through the passage 33 and through the hollow interior 32. The filling process is continued, if desired, until the liquid emerges from the upper end of the rod 15. At this point the cap 36 is placed in position, the plug 34 inserted, and the device is then ready for operation as far as the hydraulic system is concerned.

It will be obvious that there are other methods of applying fluid pressure to the port 26. The pump system may be of any variety, and a bleed or by-pass may be provided as a separate conduit. If the conduit be of extremely small dimensions, it is possible that the conduit may be left open during the operation of the pump and the flow of the pump would be sufficient to maintain pressure in the cylinder 16 regardless of the small amount passing through the by-pass conduit. If a more rapid downward movement of the piston 19 were desired, the by-pass could be made of larger diameter and provided with a valve which would remain in a closed position except when the motor 30 and the threaded member 27 were not operating.

Holding mechanism

Means are provided by the present invention to secure the valve in the opened position. In the preferred form, this mechanism has the function of holding the valve open only so long as energy is being received from an outside source. The upper end of the rod 15 is provided with the sliding member 37. This member is formed with the annular groove 38 for cooperation with the end 39 of the holding member 40. The holding lever 40 is pivoted at 41, and the radial distance from the axis of the pivot 41 to the end 39, and the distance from the axis of the pivot 41 to the side of the sliding member 37 is such that the holding lever 40 is maintained in an elevated position as shown until the annular groove 38 moves upwardly in amount sufficient to provide clearance to the end 39. As the sliding member 37 moves upwardly with the rod 15 after that point is reached, the holding lever 40 rotates in a clockwise direction as shown in Figures 1 and 2 and assumes a generally horizontal position at which time the end 39 projects into the annular groove recess 38. As long as the holding lever 40 is maintained in a generally horizontal position, it will be obvious that downward movement of the rod 15 and the sliding member 37 are prevented.

The holding of the lever 40 in horizontal position is accomplished by the solenoid generally indicated at 42. Lever 40 is constructed of magnetic material; and as long as energy is supplied to the solenoid 42, the attraction is sufficient to maintain the holding lever 40 in a horizontal position against the torque provided by the spring force applied at the end 39 by the groove 38. As soon as the energy supply to the solenoid 42 is terminated, the holding member 40 is no longer balanced or held in horizontal position, and the rotation to the position shown in Figure 1 takes place.

The operation of the holding lever 40 and the running of the motor 30 are associated through the switch 48. The switch 48 is provided with the actuating button 49, and the holding member 40 is fitted with the projection or actuating surface 50. When the holding lever 40 approaches the horizontal position, the actuating surface 50 cooperates with the button 49 causing switch 48 to interrupt the current to the motor 30. After this has been accomplished, the supply of electrical energy to the device is entirely devoted to maintaining the magnetic field of the solenoid 42. The running of motor 30 requires two conditions to be present: (a)

the receipt of energy through the lead 51, and (b) the position of the holding member at a point such that the actuating surface 50 clears the button 49. Electrical energy is supplied to the solenoid 42, the switch 48, and the motor 30 by means of suitable leads 52, 53, and 54.

Sealing

It will be obvious that the conduit with which the valve 11 is associated will supply fluid which will have a tendency to occupy the entire space in and around the valve mechanism including that portions above the moving valve member 13. The fluid in this area will have a tendency to work its way through the opening 17 around the rod 15 and into the confines of the cylinder 16 if it were not for the presence of the bellows member 55. The bellows member is securely attached to the lower portion of the piston and also to a member fixed with respect to the end plate 18. Movement of the piston causes a tendency for the bellows member 55 to axially expand and contract while still maintaining the fluid contained inside it isolated from that of the cylinder 16. To protect the bellows member 55, the tube 56 is provided which loosely surrounds the bellows and operates as a combined sheath and guiding member.

The particular embodiments of the present invention which have been illustrated in the accompanying drawings and discussed herein are for illustrative purposes only and are not to be considered as limiting the scope of the appended claims.

I claim:

1. Actuating mechanism comprising a force-applying rod; piston means operatively connected to said force-applying rod to drive the same; cylinder means cooperating with said piston means; fluid-pressure generating means communicating with said cylinder means; and retaining means cooperating with said force-applying rod to hold the same in a position established by said piston means, said retaining means including a sliding member fixed with respect to said rod and having a recess, a holding lever pivotally mounted for rotation in a plane substantially parallel to said rod on an axis disposed to one side on said sliding member and having an engaging projection extending from said axis into the path of travel of said recess and formed to withdraw therefrom on rotation about said axis, and electromagnetic means disposed to secure said holding member against the forces applied on said projection.

2. A valve-actuating mechanism comprising: a force-applying rod; biasing means disposed to urge said rod in a particular direction; piston means operatively connected to said force-applying rod to drive the same; cylinder means cooperating with said piston means; fluid-pressure generating means communicating with said cylinder means, said pressure generating means providing an exhaust for said fluid from said cylinder means on termination of pressure generation; and retaining means cooperating with said force-applying rod to hold the same in a position established by said biasing means and piston means, said retaining means including a sliding member fixed with respect to said rod and having a recess, a holding lever pivotally mounted for rotation in a plane substantially parallel to said rod on an axis disposed to one side of said sliding member and having an engaging projection extending from said axis into the path of travel of said recess and formed to withdraw therefrom on rotation about said axis, and electromagnetic means disposed to secure said holding member against the forces applied on said projection.

3. Actuating mechanism, comprising: force-applying means; power-driven force-generating means operatively connected to position said force-applying means; latch means including detent means mounted for movement to and from a position engaging said force-applying means to lock the same in position, and also including power-operated biasing means urging said detent means to locking position; and fixed biasing means urging said detent means from engaging position, said fixed biasing means having less force than said power-operated biasing means.

4. A valve-actuating mechanism, comprising: force-applying means; power-driven force-generating means oppositely connected to position said force-applying means; biasing means opposing said force-genertaing means; latch means including detent means mounted for movement to and from a position engaging said force-applying means to lock the same in position, and also including power-operated biasing means urging said detent means to locking position; and fixed biasing means urging said detent means from engaging position, said fixed biasing means having less force than said power-operated biasing means.

NORTON E. HEINTZELMAN.

References Cited in the file of this patent

UNITED STATES PATENTS

| Number | Name | Date |
|---|---|---|
| 491,369 | Moyer et al. | Feb. 7, 1893 |
| 679,898 | Josse | Aug. 6, 1901 |
| 1,836,813 | Rankin | Dec. 15, 1931 |
| 2,020,618 | Persons | Nov. 12, 1935 |
| 2,081,055 | Kiracofe | May 18, 1937 |
| 2,127,961 | Ray | Aug. 23, 1938 |
| 2,276,591 | Ray | Mar. 17, 1942 |
| 2,277,836 | Arnold | Mar. 31, 1942 |
| 2,439,523 | Miller et al. | Apr. 13, 1948 |